(12) United States Patent
Söderberg

(10) Patent No.: US 10,296,542 B2
(45) Date of Patent: May 21, 2019

(54) INTEGRATION DATABASE FRAMEWORK

(71) Applicant: SYSTEMITE AB, Göteborg (SE)

(72) Inventor: Jan Söderberg, Göteborg (SE)

(73) Assignee: SYSTEMITE AB, Göteborg (SE)

( * ) Notice: Subject to any disclaimer, the term of this patent is extended or adjusted under 35 U.S.C. 154(b) by 682 days.

(21) Appl. No.: 14/785,949

(22) PCT Filed: Apr. 28, 2014

(86) PCT No.: PCT/EP2014/058600
§ 371 (c)(1),
(2) Date: Oct. 21, 2015

(87) PCT Pub. No.: WO2014/177515
PCT Pub. Date: Nov. 6, 2014

(65) Prior Publication Data
US 2016/0070819 A1  Mar. 10, 2016

(30) Foreign Application Priority Data

Apr. 30, 2013 (EP) .................................... 13002292

(51) Int. Cl.
*G06F 16/901* (2019.01)
*G06F 16/23* (2019.01)
(Continued)

(52) U.S. Cl.
CPC ........ *G06F 16/9024* (2019.01); *G06F 16/211* (2019.01); *G06F 16/23* (2019.01); *G06F 16/25* (2019.01); *G06F 16/27* (2019.01)

(58) Field of Classification Search
CPC ......... G06F 17/30557; G06F 17/30345; G06F 17/30292; G06F 17/30289;
(Continued)

(56) References Cited

U.S. PATENT DOCUMENTS 5,884,321 A * 3/1999 Meffert ............. G06F 17/30011
6,934,749 B1 * 8/2005 Black ........................ G06F 1/14
709/217
(Continued)

FOREIGN PATENT DOCUMENTS

CN  1363886 A  8/2002
CN  101174267 A  5/2008
WO  2008151423 A1  12/2008

OTHER PUBLICATIONS

International Search Report for International Application No. PCT/EP2014/058600 dated Jun. 6, 2014, 2 pages.

*Primary Examiner* — Noosha Arjomandi
(74) *Attorney, Agent, or Firm* — RMCK Law Group, PLC

(57) ABSTRACT

A database system comprising a first database including a database manager and a schema with set of rules enabling the database manager to store and access data items in the first database, and a second database storing a plurality of data items. The schema further including rules to enable the database manager to access at least a subset of the data items in the second database. The first database further includes a first link pointing from the primary item to a replica of the secondary item stored in the first database, and a second link pointing from the replica to the secondary item in the second database.

9 Claims, 3 Drawing Sheets

(51) Int. Cl.
*G06F 16/21* (2019.01)
*G06F 16/27* (2019.01)
*G06F 16/25* (2019.01)

(58) Field of Classification Search
CPC ......... G06F 17/30082; G06F 17/30182; G06F 17/30115; G06F 17/30221; G06F 11/1446; G06F 16/11; G06F 16/23; G06F 16/18; G06F 16/21
See application file for complete search history.

(56) References Cited

U.S. PATENT DOCUMENTS

| | | |
|---|---|---|
| 6,941,309 B2 | 9/2005 | Mitomi et al. |
| 7,444,382 B2* | 10/2008 | Malik ................. G06Q 10/107 709/203 |
| 8,965,912 B2 | 2/2015 | Fukuda et al. |
| 2002/0103816 A1* | 8/2002 | Ganesh ............... G06F 11/2066 |
| 2005/0198074 A1* | 9/2005 | Khayter ............ G06F 17/30286 |
| 2006/0277224 A1 | 12/2006 | Aftab |
| 2008/0109475 A1* | 5/2008 | Burmester .......... G06F 17/2785 |
| 2009/0094229 A1* | 4/2009 | Ferrel ............... G06F 17/30557 |
| 2009/0254572 A1* | 10/2009 | Redlich ................. G06Q 10/06 |
| 2011/0099147 A1* | 4/2011 | McAlister ......... G06F 17/30581 707/639 |
| 2014/0123237 A1* | 5/2014 | Gaudet .................. H04L 63/08 726/4 |
| 2016/0070819 A1* | 3/2016 | Soderberg ......... G06F 17/30557 707/694 |

\* cited by examiner

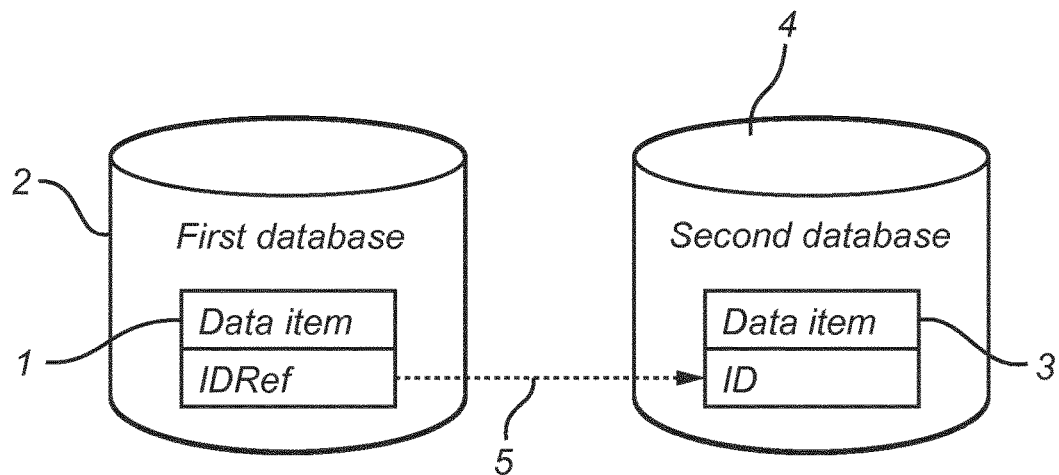
(Prior art) Fig. 1
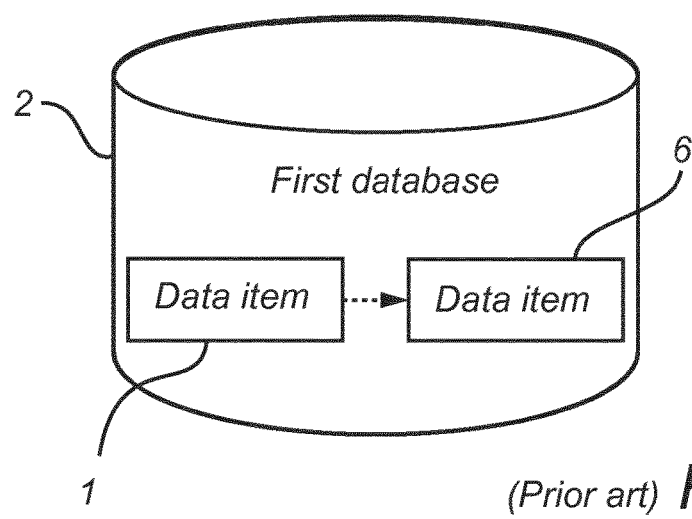
(Prior art) Fig. 2

INTEGRATION DATABASE FRAMEWORK

CROSS-REFERENCE TO RELATED APPLICATIONS

This application is a 371 U.S. National Stage of International Application No. PCT/EP2014/058600 filed Apr. 28, 2014, which claims priority to European Application No. 13002292.4 filed on Apr. 30, 2013. The disclosure of each of the above applications is incorporated herein by reference in their entirety.

FIELD OF THE INVENTION

The present invention relates to a method for creating a link between different databases. The general purpose is to enable integration of information between different databases so that centralized access of information can be provided for any kind of database included in an integration framework.

BACKGROUND OF THE INVENTION

In many organizations, information used by an individual user is stored in multiple databases. There may be several reasons for this, but the use of many different computer tools very frequently leads to storage in different databases.

One context where this is particularly relevant is product or system development. Currently there are many different computerized system development tools; each specialized in specific development tasks or domains. Examples of such are Requirement Management/Engineering tools, System Architecture tools, Test Automation Tools, UML tools to mention a few.

In order to make development efficient, the information stored by the tools in different databases needs to be managed. Such management includes finding related information in different tools, traceability tasks, generating reports that gather information from different tools, accessing information in one tool from another, etc.

Historically, integration of development tools has been focused on either the format of information for transfer of information between the tools, or complete integration solutions for specific tools. This approach has been less than successful, mainly due to limitations and costs of the integration, and instead there has emerged standards for general exchange of information that go deeper into the interpretation and management of the information in the various tools. Examples of such standards include Requirements Interchange Format (RIF) (see e.g. http://en.wikipedia.org/wiki/Requirements Interchange Format) and XMI (see e.g. http://www.omg.org/spec/XMI/).

A limitation of these approaches is that they are limited to discrete ad hoc transfer of information from one tool to another. They do not provide a more systematic solution to the problem that information is stored in different databases.

Any database with identification of its data items can be integrated into another database by means of references to data items using the identification, thereby forming a "link". FIG. 1 illustrates a link 5 from a primary item 1 in a first database 2 to a secondary item 3 in a second database 4. To make the link effective there must also be means of access to the secondary item 3 using the identification. Such simple linking, such as hyperlinks used in HTTP, supports access to data and possibly navigation or browsing in structures from one data element to another. However, with this approach it is not possible to trace a link backward, i.e. to detect within database 4 that there is actually a reference to the data item 3. As a consequence of this, data integrity cannot be maintained in one database; if item 3 is deleted, the link is "broken". Further, it is not possible to perform set operations of data in multiple Data sources. Examples of such set operations are the "join"-operations available in SQL databases.

In order to overcome some of these limitations, data elements from one database can instead be replicated into another database. This is illustrated in FIG. 2. Here, a copy (replica) 6 of a secondary item is stored in the first database 2. This replica 6 can be accessed from the primary data item 1, and makes access to data quicker, as only one database is involved, and also enables set operations.

However, also this approach has other limitations. First of all, there is no systematic way to achieve the integration (replication), so it has to be performed from each database to another. Further, once the replication has been made, the first database, and its management system, cannot determine that the item is a replica, and even less where the original item is stored. In order to handle such problems, conventional databases employing integration by replication, require additional application software to keep track of which items are in fact replicas, and to handle the relationship between these replicas and the original items.

An example of a system for managing and updating data from different sources suffering from at least some of the above drawbacks is disclosed by WO2008151423.

GENERAL DISCLOSURE OF THE INVENTION

It is an object of the present invention to overcome this and other problems, and to provide linking between different databases that provides systematic integration of information distributed in several databases.

According to a first aspect of the present invention, this and other objects are achieved by a database system comprising a first database including a database manager and a schema with set of rules enabling the database manager to store and access data items in the first database, and a second database storing a plurality of data items, the schema further including rules to enable the database manager to access at least a subset of the data items in the second database. Furthermore, the schema includes a plurality of data item types, the data item types each includes a marker field indicating if a data item is a replica of a secondary item in the second database. The first database further includes a link between a primary item in the first database and a secondary item in the second database, the link comprising a first link pointing from the primary item to a replica of the secondary item stored in the first database, and a second link pointing from the replica to the secondary item in the second database.

According to a second aspect of the present invention, this and other objects are achieved by a method for creating a link between a first database and a second database, the first database comprising a database manager and a schema including set of rules enabling the database manager to store and access primary data items in the first database, and the second database storing a plurality of secondary data items. The method comprises extending the schema to include rules to enable the database manager to access at least a subset of the items in the second database, the schema includes a plurality of data item types, the data item types each includes a marker field indicating if a data item is a replica of a secondary item in the second database, receiving a request to establish a link from a primary item in the first database to a secondary item in the second database, verifying that the schema includes access rules to enable the database manager to access the secondary item, accessing, by the database manager, the secondary item and storing, in the first database, a replica of the secondary item, creating a link from the replica to the secondary item and creating a link from the primary item to the replica.

The expression "database" is here used in a broad sense, indicating any data source providing storage of data items according to determined principles. Examples of such data sources are relational databases and object databases, but may also be any computer file that supports some kind of ID to the data items included in the file (like GUID, UUID, see e.g. http://en.wikipedia.org/wiki/GUID, http://en.wikipedia.org/wiki/UUID).

A database schema defines data items stored in a database, including the types of the data items, and the possible associations between different data items. The schema may also create the underlying data structures that allow the creation of database items. For example, in a relational database the tabular structure defined by the relational schema is required for storing relations in the table. In an object database the schema defines all object types and object links that are stored in the database According to the present invention, a schema of a specific database (the first database) is extended to cover not only the data items in that specific database, but also data items potentially stored in other external databases. In other words, one single schema will include definitions of data item types, associations, storage structure, etc, relating to more than one database. The common schema additionally describes information to improve access to information (decreased latency, increased availability) related to data that is stored in the second database that is not represented in the first database. This is achieved by a specific type, or marker, indicating that a data item is only stored in the second database. The first database will thus only store a pointer or "handle" to the data item.

The extended schema includes all information required for the integration and access of data items. Such an extended schema thereby makes content in the second database accessible from the first database to allow a novel type of link. Such a link will include two portions; a first portion pointing from the primary item to the replica, and a second portion pointing from the replica to the secondary item itself, in the second database.

According to the invention, it is possible to use replication in order to achieve integration, compared with conventional replication, which is made only for the purpose of allowing access, or to achieve decreased access latency.

With links between database items according to the present invention, integration of information stored in different databases is made possible, as information is traceable and exchange of data is possible. Further, joint data integrity can be achieved for all databases integrated according to the invention. The extended schema will be able to know which items are in fact replicas, and ensure that such items are managed accordingly by the DBMS, the DataBase Management System at hand.

The first database may be used as an "integration" database, providing access to all information required by a user to work with several different computer tools. This makes it possible to locate and access all relevant data in different databases from one single entry point. The integration (first) database will thus store a representation (replica) of any information used by the various tools that is stored in any other (second) database.

Integration between databases according to the present invention, based on an extended schema, allows data stored in different databases to be integrated into a common schema so that data can be traced and maintained consistent in a uniform and efficient way. The integration and replication capabilities mean that data can be queried in one single database, despite the original data may reside in some other database instance.

The option of partial replication means that replicated data items can be queried in the integration database while other data items related to the replicated data items can be efficiently queried in a secondary step since the source location of the related data is stored in the integration database.

Integration according to the present invention supports an optional systematic migration of data between the different databases. In a first step, data can be replicated from the original database to the integration database, and then, in a second step when the replication is complete, the original database can be deemed redundant. In a third optional step some other database instance can be set out as a new original database.

According to one embodiment, the extended schema is used to make all databases used by an organization accessible from one single system entry point. In other words, the extended schema describes all types of information that can be stored and accessed, the relation between all parts of data, and the format and interpretation of the data.

The secondary database may contain additional content (entire data items of some types, parts of data items of some types, etc.) which is not covered by the extended schema. Such data must then not be critical in order to define the relation between the primary and secondary databases.

The extended schema may be pre-defined. Alternatively, it may be created and extended by automatic examination of the schemas of specific databases.

The extended schema may be defined according to object database principles or relational databases principles.

The extended schema typically describes the following information:
  The types of data items that can be stored in the first database or the second database
  For data items stored in the second database, the location and method of access to the data items in the second database.
  The type of relation between data stored in the first database or the second database The common schema may additionally describe the following information to improve access to information (decreased latency, increased availability):
  An address to a default second database for specific types of data items. Such a default address will enable data items of this specific type may be created in the first database, but still include a pointer to an "original" data item in the second database. The item in the first database will thus in effect be a replica, even though it has been created in the first database. Such an address may be expressed as a internet IP address or computer name in such a way that it uniquely identifies the location of the database within the given computer network. (http://en.wikipedia.org/wiki/Ip address).
  Information about a default database can also be used for improving random search for data of a specific type that may origin from multiple data sources, in case the search cannot be based on data available in the first database.

BRIEF DESCRIPTION OF THE DRAWINGS

The present invention will be described in more detail with reference to the appended drawings, showing currently preferred embodiments of the invention.

FIG. 1 illustrates a conventional link between two databases.

FIG. 2 illustrates replication of a data item from one database into another.

DETAILED DESCRIPTION OF PREFERRED EMBODIMENTS

The invention will be described in the following with reference to an exemplary database, which should not be regarded as limiting to the inventive concept.

Figure 3:
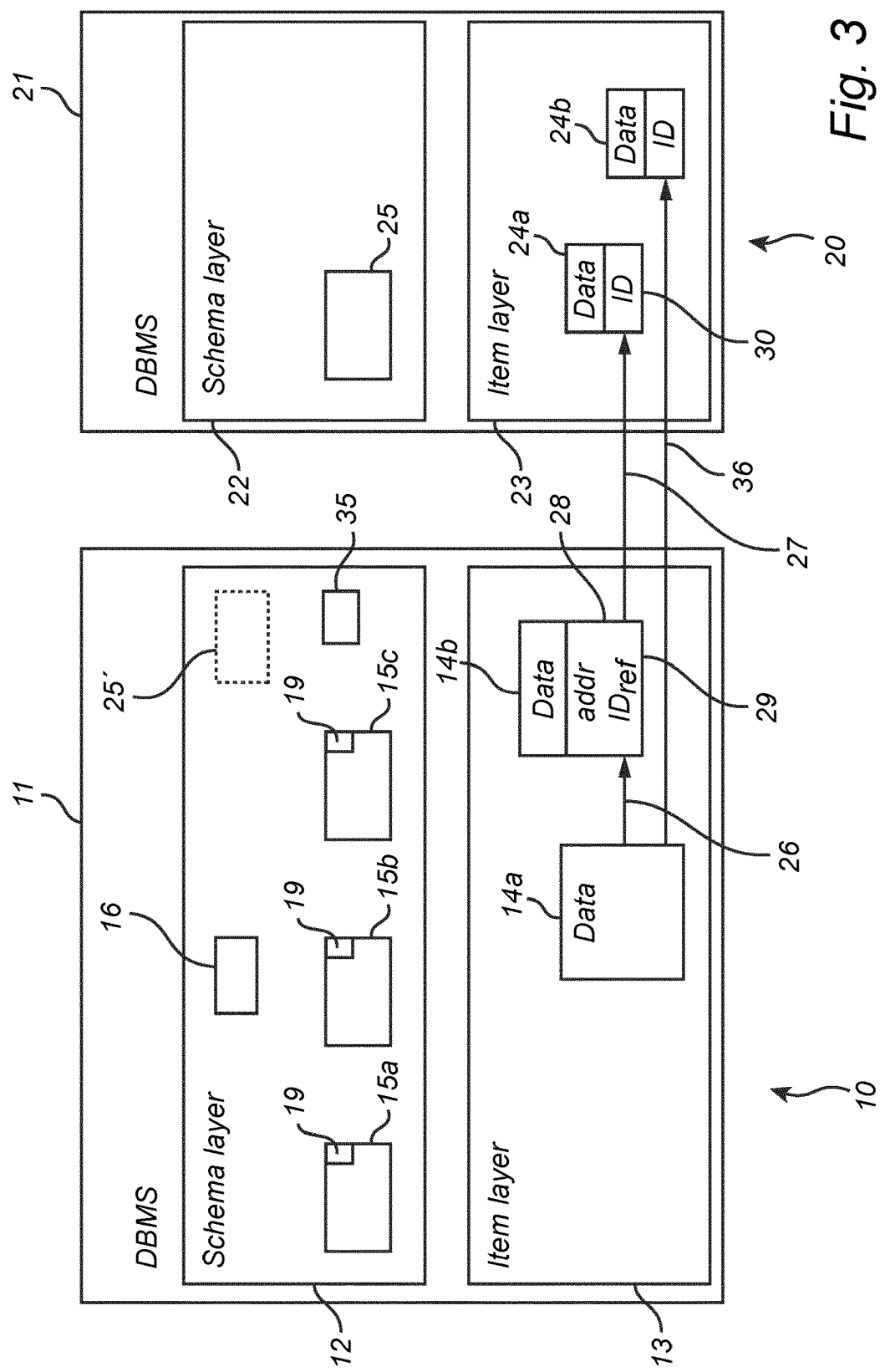
FIG. 3 is a schematic block diagram of a database system implementing the invention.

The database 10 in FIG. 3 comprises a Database Management System (DBMS) 11, which physically stores a schema layer 12 and an item layer 13. The database physical layer, which is the actual storage of both the schema layer 12 and item layer 13 in computer memory or disk, is not shown in FIG. 1, since there are a number of well-known implementations of physical layers, out of the scope of this disclosure.

The database schema layer 12 (or simply the schema) defines all data items 14a, 14b stored in the item layer 13. Depending on the type of database the schema 12 may look different. For example in a Relational Database Management System (RDBMS), the schema defines the tables of the RDB, while in an object database the schema defines all object types and object links that are stored in the database. In the illustrated case, the schema 12 stores item types 15a, 15b and association types 16, defining the data items 14a, 14b in the item layer 13 and the associations (or links) 17 between those data items, respectively. The schema may further create the basic data structures in the item layer that allows the creation and storage of data items.

The item layer 13 conforms to the schema 12, in the sense that only such data items 14 that conform to the schema 12 may be stored in the item layer 13. It is the database management system 11 that provides external access to the item layer 13, and thus ensures that the item layer 13 always conforms to the schema 12.

FIG. 3 further shows a second database 20, also including a DBMS 21, a schema layer 22, and an item layer 23. The item layer stores data items 24 conforming to data types 25 in the schema 22.

As further illustrated in FIG. 3, according to the present invention, the schema 12 is extended to incorporate definitions also of data items 24 (and any relations) stored in a second database 20. This enables the DBMS 11 in database 10 to access and perform operations also on these data items. This is schematically illustrated in FIG. 3 as a dashed box 25' in schema 12, indicating that the schema 12 now includes information to access data item 24.

According to one embodiment, the definitions 25' required by the DBMS 11 of the integration database 10 to access and handle items in the second database 20 is provided using Open Services for Lifecycle Collaboration (OSCL), (http://open-services.net/). This standard provides a systematic approach to incorporating type definitions from one database to another.

In order to allow the DBMS 11 to manage data items 14a, 14b, 24 in the two different databases 10, 20 with maintained integrity, it is important that the DBMS 11 can determine if an item is an "original" item 14a stored only in the first database 10, or if it is in fact a replica 14b of a secondary item 24 stored in the second database 20. For that purpose, each item type 15a, 15b includes a marker 19 that indicates if a data item 14a, 14b of this specific type 15a, 15b, 15c:
1. resides only in the same database instance (here: the first database 10),
2. is a replica of an item originally stored in an external database (here: the second database 20),
3. resides only in an external database, or
4. optionally resides in an external database.

The first case (type 15a) corresponds to a data item 14a, stored only in the first database. The data item 14a conforms to the type 15a, which is unique to the first database 10. This is similar to most conventional database solutions, where all data items are stored in one database.

The second case (type 15b) corresponds to a data item 14b, which is a copy (replica) of a secondary data item 24a in the second database 20. The secondary item 24a confirms to type 25 in schema 22. The item 14b conforms to the type 15b which includes, or makes reference to, the type 25' which, as explained above, is substantially equal to type 25. This means that DBMS 11 in the first database 10 can access the secondary item 24a based on the contents of type 25'.

The second case thus corresponds to a combination of the prior art solutions illustrated in FIGS. 1 and 2. It allows a novel type of link to be created between a primary item 14 in the first database 10 (also referred to as an "integration" database) and a secondary item 24a in the second database 20 (also referred to as an "external" database), similar to FIG. 1. However, according to the present invention, this link is divided into two links: a first (internal) link 26 pointing from the primary item 14a to the replica 14b, and a second (external) link 27 pointing from the replica 14b to the original secondary item 24a. The nature of the internal link 26 will depend on the database 10 and its schema 12. For example, in case of a relational database, the link 26 will comprise an IDref pointing to an ID of the replica 14b. In the case of an object database, the link 26 will be an association of a specific type (e.g. type 16 discussed above). The external link 27 will typically require the replica 14b to store an address 28 to the second database 20 and a reference 29 to an identifier (ID) 30 of the original data item 24a.

The replication makes access to data item 24a from database 10 quicker, as only one database is involved. However, by extending the schema 12 of database 10 to allow access also to the original item 24a, integrity can also be achieved. In particular, any create or write operation on data item 14b (the replica) must trigger a corresponding create or write operation on the original data item 24a in the second database 20 by the database management system 11.

It should be noted that the replica 14b is not necessarily a complete copy of the item 24a. If appropriate, the replica may be partial, reducing required storage capacity in the integration database 10. An example of information that may not be required is information about links from item 24a. In an extreme case, the replica is reduced to an address field, i.e. an item with no data, only a link to the item 24a. If the replication is incomplete, it is required that the type 15b indicates this possibility.

In the third case (type 15c), a data item 24b is stored only in the second database 20. This case is similar to the situation in FIG. 1, albeit providing a more systematic approach to providing this functionality. This means that any access including read or write operations to such data items, their attributes or relations to other data items, by DBMS 11 in database 10 must be directed to the external database 20. Just like type 15b, the type 15c also includes or makes reference to the type 25', enabling the DBMS 11 to access the data item 24b in database 20. For example, as indicated in FIG. 3, an item 14a may include a reference (link) 36 to data item 24b. In this case the data item 14a will need to store an address to the external database and an identifier of the data item 24b (not shown).

In order to offer create operations of an item of type 15b or 15c (case 2 and 3 above) in the integration database 10, the schema 12 must include a default address 35 of the external database 10, or optionally this information has to be supplied by the user of the create operation. This kind of data items are created a part of a replication request to the DBMS of the integration database, pointing out the original database and identifier of the corresponding data item.

The fourth case is essentially a mix of the first and second cases, and will not be discussed in detail. Items of this type may either be stored only in the integration database 10 (first case), or may be replicated items, i.e. items originally created in an external database 20 (second case). Any item of a type with a marker according to the fourth case, must in its turn include a marker indicating if it is a replica or not.

In the case of an object database, the same kind of marker 19, according to one of the four cases above, is also used for each association type 16.

Figure 4:
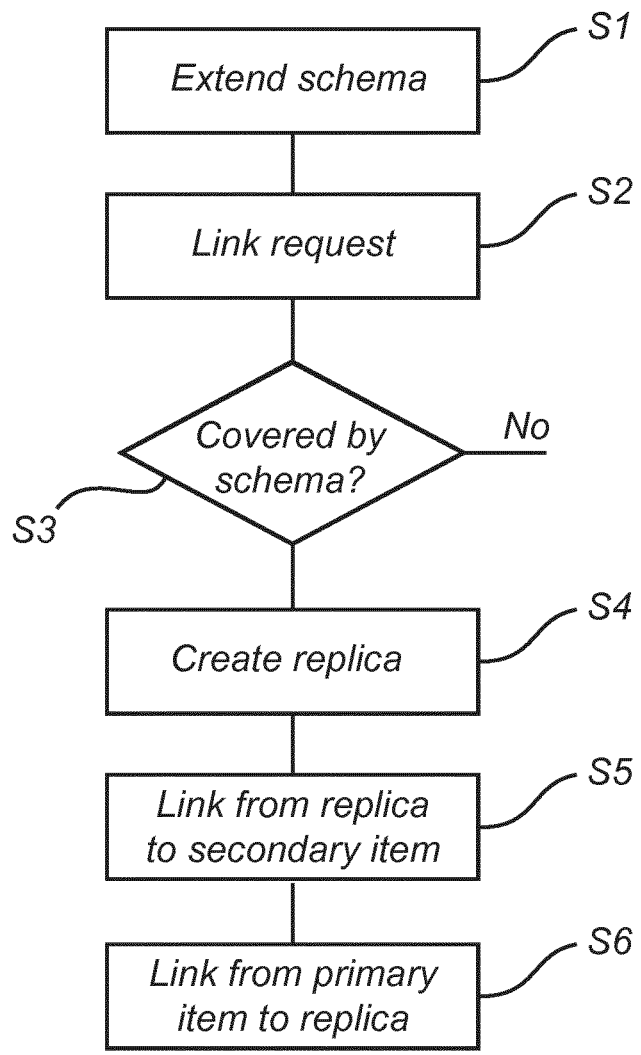
FIG. 4 is a flow chart of a method according to an embodiment of the invention.

With reference to FIG. 4, a process of establishing a link between a primary item 14a in the first database 10 and a secondary item 24a in the second database 20 according to an embodiment of the invention will be discussed.

First, in step S1, the schema 11 is extended to include the definition of the type 25 of item 24a. Obviously, this step may have been performed a long time before the remaining steps.

Then, in step S2, a request is received by the DBMS 11 to link to item 24a in the second database 20. At this point (step S3) the DBMS 11 determines that its schema 12 in fact is extended to handle items of the type 25 in database 20. When confirmed, in step S4, the DBMS 11 proceeds to access the item 24a in database 20, and creates a copy (replica) 14b in database 10. The replica includes an address of the second database 20, and a reference to the ID 30 of item 24a, thereby creating a link 27 (step S5) from the replica 14b to the secondary item 24a. The DBMS finally (step S6) creates a link 26 from primary item 14a to the replica 14b.

In the following, database operations required for the case 1, 2, 3 and 4 described above will be discussed with reference to FIG. 3.

Case 1 is similar to database operations according to prior, i.e. create, read, update and delete operations are executed by the DBMS 11 according to user commands, for data items of the database according the schema 12 of the first database 10 (http://en.wikipedia.org/wiki/Create, read, update and delete).

Case 2 and 4 involves a replica 14b of a secondary item 24a in database 20. When data items 24a in the external (second) database 20 are created, updated or deleted independent of operations to the integration (first) database 10, this therefore has to be detected and managed by some means. Conventional methods include using so-called triggers in the second database and scheduled analysis of modified data items based on the time of modification. Such updates must then be reflected by the corresponding commands to the DBMS 11 of the integration database 10 including setting of the external data item ID 30 for create operations. Since there is no systematic solution for this case it has to be solved by additional application software, and it is therefore not the preferred alternative according to the present invention. However, in case the operations in the second database were performed before the integration (first) database 10 was set up, this would correspond to the common, initial situation of un-integrated databases, where the use of methods according to prior art are required in order to set up a consistent integrated state where all to-be replicated data items in the second database are in fact replicated into the integration database.

This use case also corresponds to case 3, where no replication is performed for a specific type 15c of data items, i.e. read operations must be performed for the specific external database.

For case 2, there are two different create operations.

(case 2a) If there is a default external database 35 defined for the data type according to the schema 12, a create command may be executed of the DBMS 11 of the integration database 10. For that case the data item 24a is first created in the second database 20, using the method registered in the schema 12. If this step is successful then in a second step the replicated data item 14b is created in the integration database 10, following the data structure of replicated data items described above, including the ID 29 of the data item 24a in the second database 20.

(case 2b) If there is no default external database defined in the schema 12 for the data type, create commands to the DBMS 11 must include the identity, location and method of access to the second database 20, or else the create command may not be executed by the DBMS 11 of the integration database 10. Data items 24a, 14b are then created in the second and first database in the same way as above (use case 2a) with the exception that the identity, location and method of access is then stored for the specific data item in the integration database.

When replica items 14b have been created according to case 2a or 2b above, a consistent replication state is maintained between the first and second database, and read operations to the first database will yield the same result as read operations to the second database. Any update or delete operations to a replica data item in the integration database 10 will first be executed as the corresponding operation to the item 24a in second database 20, using the stored identity, location and method of access of the data item 14b in the integration database 10. When this operation is successfully completed the data item 14b in the integration database 10 will be modified in a second step, in the same way.

Any update or delete operations must adhere to the integrity policy (http://en.wikipedia.org/wiki/Data integrity), including referential integrity, of both the external and integration database, where the DBMS 11, 21 of each database will be responsible for their part. In case the update or delete operation fails for the external database the operation must be interrupted and reversed also for the integration database. In case the deletion will violate integrity of the integration database the delete operation must not be invoked to the external database in the first place. Note that there is a difference between update and delete operations, in that update operations in the external and integration database should follow the same integrity constraints, given that such properties of the schema of the external database is assumed to be reflected by the schema of the integration database. A delete operation in one of the databases may however be successful while at the same time the same delete operation is not successful in another database, due to possible additional links or references in that database.

For case 3 all database operations to the DMBS of the integration database will be forwarded to DBMS of the external database, where the identity, location and method of access must also be provided, in case these are not included as default values in the schema of the integration database.

For case 4 database operations to the DBMS of the integration database may either be executed as requested for the operation either 1) only for the integration database, according to case 1, or 2) only to the external database, where the identity, location and method of access to the external database must also be provided in the operation, where the operation will be performed in the same way as for case 3 described above, or 3) to both databases where the operation will be performed in the same way as for 2b described above. The identity, location and method of access to the external database can either be included in the commands, or a default value could be used, according to the data item type in the database schema of the integration database.

A preferred implementation of the joint operations to the external and integration database described above is by means of database transactions (http://en.wikipedia.org/wiki/Database transaction) whereby a failed operation in either database could be jointly rolled-back to the state identical to that before the operation for both databases. Note that such transaction may have to be executed as separate transactions in both databases, where a roll-back needs to be performed for each database separately, should the operation fail for either of them, as controlled from the DBMS of the integration database that requests the command for the external database.

The person skilled in the art realizes that the present invention by no means is limited to the preferred embodiments described above. On the contrary, many modifications and variations are possible within the scope of the appended claims. For example, more than one "second" database are possible.

The invention claimed is:

1. A method for creating a link between a first database and a second database,
    said first database comprising a database manager and a schema including set of rules enabling said database manager to store and access primary data items in said first database,
    said second database storing a plurality of secondary data items,
    said method comprising:
    extending said schema to include rules to enable said database manager to access at least a subset of said items in said second database, wherein said schema includes a plurality of data item types, said data item types each includes a marker field indicating if a data item is a replica of a secondary item in the second database,
    receiving a request to establish a link from a primary item in the first database to a secondary item in the second database,
    verifying that said schema includes access rules to enable said database manager to access said secondary item,
    accessing, by said database manager, said secondary item and storing, in said first database, a replica of said secondary item,
    creating a link from said replica to said secondary item, and
    creating a link from said primary item to said replica.

2. The method according to claim 1, wherein the first database is used as an integration database, providing access to all information required by a user to work with several different computer tools.

3. The method according to claim 2, wherein the schema extended so as to enable the database manager to access data items in any database used by an organization.

4. The method according to claim 1, wherein the second database stores additional content which is not covered by rules of the schema.

5. The method according to claim 1, wherein the replica is not a complete copy of the secondary data item.

6. The method according to claim 1, further comprising a step of performing, at scheduled points in time, an update of said replica, to reflect any changes made to the secondary data item.

7. The method according to claim 1, wherein the step of extending said schema includes automatically examining schemas of specific databases and extracting rules required to access data items in said specific databases.

8. The method according to claim 1, wherein the schema is defined according to one of object database principles and relational databases principles.

9. A database system comprising:
    at least one processor;
    a first database including a database manager and a schema with set of rules enabling said database manager to store and access data items in said first database,
    a second database storing a plurality of data items, said schema further including rules to enable said database manager to access at least a subset of said data items in said second database, wherein said schema includes a plurality of data item types, said data item types each includes a marker field indicating if a data item is a replica of a secondary item in the second database,
    said first database further including a link between a primary item in said first database and a secondary item in said second database, said link comprising a first link and a second link,
    said first link pointing from said primary item to a replica of said secondary item stored in said first database, and said second link pointing from said replica to said secondary item in said second database.

* * * * *